United States Patent
Al-Safran et al.

(10) Patent No.: US 11,739,250 B2
(45) Date of Patent: Aug. 29, 2023

(54) EMULSIFIED RESIN-BASED LOSS CIRCULATION MATERIALS FOR LOW PRESSURE FORMATIONS

(71) Applicant: SAUDI ARABIAN OIL COMPANY, Dhahran (SA)

(72) Inventors: Ali Al-Safran, Dhahran (SA); Khawlah A. Alanqari, Al-Khubar (SA); Vikrant Wagle, Dhahran (SA); Abdulwahab Al-Joher, Dhahran (SA); Abdullah S. Al-Yami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/185,000

(22) Filed: Feb. 25, 2021

(65) Prior Publication Data
US 2022/0267664 A1 Aug. 25, 2022

(51) Int. Cl.
*C09K 8/512* (2006.01)
*E21B 21/00* (2006.01)
*E21B 33/138* (2006.01)
*C09K 8/504* (2006.01)

(52) U.S. Cl.
CPC ............ *C09K 8/512* (2013.01); *C09K 8/5045* (2013.01); *E21B 21/003* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 5,911,282 A | 6/1999 | Onan et al. | |
| 6,350,309 B2 | 2/2002 | Chatterji et al. | |
| 8,935,957 B2 | 1/2015 | Kulkarni et al. | |
| 9,828,293 B2 | 11/2017 | Yadav et al. | |
| 10,005,930 B2 | 6/2018 | Reddy | |
| 10,066,146 B2 | 9/2018 | Morgan et al. | |
| 10,081,755 B2 | 9/2018 | Ballard | |
| 10,144,858 B2 | 12/2018 | Kennedy et al. | |
| 2010/0210480 A1 | 8/2010 | Ballard et al. | |
| 2016/0348464 A1 | 12/2016 | Sabins et al. | |
| 2017/0174975 A1* | 6/2017 | De Stefano | E21B 21/003 |
| 2017/0247296 A1* | 8/2017 | Salla | C04B 20/1029 |
| 2020/0071593 A1 | 3/2020 | Al-Yami et al. | |
| 2020/0071595 A1 | 3/2020 | Al-Yami et al. | |
| 2020/0071598 A1 | 3/2020 | Al-Yami et al. | |

FOREIGN PATENT DOCUMENTS

WO 2016057027 A1 4/2016

OTHER PUBLICATIONS

Schneider, Cássio L. et al., "Experimental Study of Liquid-Solid Flow Applied to Lost Circulation Control in Fractured Channel", JEM-2017-0022, Journeys in Multiphase Flows, ABCM, Mar. 2017 (10 pages).

Zhong, Hanyi et al., "Mitigation of Lost Circulation in Oil-Based Drilling Fluids Using Oil Absorbent Polymers", Materials, MDPI, vol. 11, Oct. 2018, pp. 1-20 (20 pages).

* cited by examiner

*Primary Examiner* — Andrew Sue-Ako
(74) *Attorney, Agent, or Firm* — Osha Bergman Watanabe & Burton LLP

(57) ABSTRACT

Lost circulation material (LCM) compositions may include an epoxy resin, an emulsifier comprising a polyaminated fatty acid, water, a crosslinker, and an optional cementitious and/or weighting agent. These LCM compositions may have a density of from about 63 pounds per cubic foot (pcf) to about 99 pcf and may be capable of being injected through a drill bit of a drill string into a lost circulation zone in wellbores. Corresponding methods of eliminating or reducing lost circulation in a lost circulation zone from a well may include introducing these LCM compositions into the well.

15 Claims, No Drawings

EMULSIFIED RESIN-BASED LOSS CIRCULATION MATERIALS FOR LOW PRESSURE FORMATIONS

BACKGROUND

Extracting hydrocarbons from subterranean formations requires drilling a wellbore extending from the surface to a location below the surface to provide access to these hydrocarbon-bearing subterranean formations. Specialized drilling techniques and materials may be utilized to form the wellbore hole and extract the hydrocarbons. Specialized materials utilized in drilling operations may include drilling fluids and materials for sealing the annulus, located between the outer casing and the inner wall of the wellbore. Such drilling fluids may be formulated for specific downhole conditions.

While drilling a wellbore, cementing the wellbore, or both, lost circulation zones may be encountered and may result in loss of drilling fluid or cementing compositions. In a lost circulation zone, the drilling fluids, cement compositions, or other fluids flow out of the wellbore and into the surrounding formation. Lost circulation zones may result in an increased cost of the well from the increased material costs to replace lost fluids and the downtime to remediate the lost circulation zone. Lost circulation zones may be remediated by introducing a lost circulation material into the lost circulation zone to seal off the lost circulation zone to prevent further fluid loss. Conventional lost circulation materials (LCMs) can include bridging material, fibrous material, flaky material, and other materials having different particle sizes.

SUMMARY

In one aspect, embodiments disclosed herein are directed to lost circulation material (LCM) compositions including an epoxy resin, an emulsifier comprising a polyaminated fatty acid, water, a crosslinker, and an optional cementitious and/or weighting agent. These LCM compositions may have a density of from about 63 pounds per cubic foot (pcf) to about 99 pcf and may be capable of being injected through a drill bit of a drill string into a lost circulation zone in wellbores.

In another aspect, embodiments disclosed herein are directed to methods of eliminating or reducing lost circulation in a lost circulation zone from a well. The methods may include introducing LCM compositions into the well. In these methods, the LCM compositions may include an epoxy resin, an emulsifier comprising a polyaminated fatty acid, water, a crosslinker, and an optional cementitious and/or weighting agent. Further, in these methods, the LCM compositions may have a density of from about 63 pcf to about 99 pcf.

Other aspects and advantages of the invention will be apparent from the following description and the appended claims.

DETAILED DESCRIPTION

When a lost circulation zone is encountered during drilling or cementing a wellbore, fluids in the wellbore flow from the wellbore into the subterranean formation, resulting in loss of these fluids. These fluids can include but are not limited to drilling fluids, sealing compositions, spacer fluids, wash fluids, preflush fluids, or displacement fluids. In some instances, lost circulation may be caused by the natural state of the subterranean formation through which the drilling passes. For example, the subterranean formation may be naturally fractured or may be an unconsolidated formation, such as but not limited to gravel, sand, pea, or combinations of these. Alternatively, in other circumstances, the hydrostatic pressure of the fluids in the wellbore may be greater than the fracture gradient of the subterranean formation, which may cause at least some breakdown of the pores in the formation. If the pores in the formation breakdown, then the pores may become large enough to reduce the resistance to flow of fluids into the pores, which may result in the formation receiving fluids from the wellbore instead of resisting the flow of these fluids into the formation.

Lost circulation zones may be remediated by introducing an LCM into the subterranean formation in the lost circulation zone to seal the lost circulation zone from the wellbore by blocking flow pathways in the subterranean formation and preventing flow of fluids from the wellbore into the subterranean formation. Specific examples of conventional LCMs may include but are not limited to cements, paper, cottonseed hulls, nutshells, or combinations of these. These materials may be able to remediate many lost circulation zones by forming a layer of solids over the formation at the lost circulation zone. The LCM may be injected into the lost circulation zone or squeezed into the lost circulation zone. Low pressure formations, however, should not be exposed to high hydrostatic pressure or highly dense materials, as this may result in breakdowns of the formation and loss of production efficiency, as well as safety and wellbore control issues. In this context, conventional LCM materials have densities that are too high to allow for the sealing of lost circulation zones in low pressure formations, including formations at shallow depths up to 5000 feet.

One or more embodiments of the present disclosure relate to LCM compositions and methods of using these LCM compositions in low pressure formations to reduce or eliminate lost circulation. The LCM compositions are based on emulsified resins having controlled viscosity and setting time and the methods using these LCM compositions allow for the sealing of lost circulation zones in low pressure formations or at shallow depths. The emulsified resin-based LCM compositions according to one or more embodiment may include an epoxy resin, an emulsifier comprising a polyaminated fatty acid, water, a curing agent operable to cure the epoxy resin, and an optional cementitious and/or weighting material. The LCM compositions may have a density of greater than or equal to 63 pounds per cubic foot (pcf) (equivalent to about 1009 kilograms per cubic meter (kg/m$^3$), where 1 pcf=1 lb/ft$^3$=16.02 kg/m$^3$), such as in the range from 63 pcf to 99 pcf (equivalent to about 1586 kg/m$^3$), and may be capable of being injected through a drill bit of a drill string into the lost circulation zone, thus resulting in sealing the lost circulation zones in wellbores in low pressure formations or at shallow depths.

In this disclosure, the term "hydrocarbon-bearing formation" refers to a subterranean geologic region containing hydrocarbons, such as crude oil, hydrocarbon gases, or both, which may be extracted from the subterranean geologic region.

In this disclosure, the term "fluid" may include liquids, gases, or both. In this disclosure, the term "spacer fluid" refers to a fluid utilized to space apart any two other materials utilized in well production.

In this disclosure, the term "set," "setting," or "thickening," when used in the context of the LCM compositions, may refer to the process of a liquid, slurry, or fluid composition becoming a solid, semi-solid, or gelled composition.

The term "setting time" or "thickening time" may refer to a length of time between a first time at which the composition components are combined or placed in a wellbore and a second time at which the composition has a consistency or pumpability of at least 70 Bearden units (Bc).

In this disclosure, the term "cure" or "curing," when used in the context of the epoxy resin(s)s, may refer to the process of cross-linking the epoxy resin.

In this disclosure, the term "cure time," when used in the context of the epoxy resin(s), may refer to a time duration between a first time at which a curing agent is added to the epoxy resins and a second time at which the epoxy resin(s) has cured to form at least a cross-linked epoxy resin.

The emulsified resin-based LCM compositions according to one or more embodiments may provide more stable formulations to remediate loss circulation problems in low pressure formations or at shallow depths compared to conventional cements. The emulsified resin-based LCM compositions may form a barrier to prevent drilling fluids at a pressure greater than the formation pressure from flowing out of the wellbore and into the formation. The LCM compositions may exhibit greater stability and reduced density compared to conventional cement compositions. As a result, the LCM composition may reduce or prevent penetration of drilling fluids into the low pressure formations or at shallow depths.

In one or more embodiments, the emulsified resin-based LCM compositions may include an epoxy resin or a mixture of epoxy resins. The epoxy resin(s) may include bisphenol-A-based epoxy resins, bisphenol-F-based epoxy resins, aliphatic epoxy resins, aromatic epoxy resins, Novalac resins, or combinations of these epoxy resins. Aliphatic and aromatic epoxy resins may include glycidyl ethers and diglycidyl ethers. Glycidyl ethers may include alkyl glycidyl ethers, aromatic glycidyl ethers, or both. Glycidyl ethers may have chemical formula (I):

$$R^1-O-CH_2-(C_2H_3O) \quad (I)$$

where $R^1$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In some embodiments, $R^1$ may be a branched, linear, or cyclic alkyl. In some embodiments, $R^1$ may include one or more substituted or unsubstituted aromatic rings. In some embodiments, the epoxy resin may include C12-C14 alkyl glycidyl ethers, butyl glycidyl ether, 2,3-epoxypropyl-o-tolyl ether, or combinations of these. Diglycidyl ethers may have chemical formula (II):

$$(OC_2H_3)-CH_2-O-R^2-O-CH_2-(C_2H_3O) \quad (II)$$

where $R^2$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In some embodiments, $R^2$ may include one or more substituted or unsubstituted aromatic rings. In some embodiments, $R^2$ may be an alkyl group or cycloalkyl group. For example, in some embodiments, the epoxy resin may include 1,6-hexanediol diglycidyl ether, which has chemical formula (III):

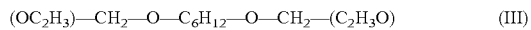

$$(OC_2H_3)-CH_2-O-C_6H_{12}-O-CH_2-(C_2H_3O) \quad (III)$$

In some embodiments, the epoxy resin(s) may include cyclohexanedimethanol diglycidyl ether, which has chemical formula (IV):

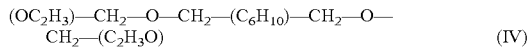

$$(OC_2H_3)-CH_2-O-CH_2-(C_6H_{10})-CH_2-O-CH_2-(C_2H_3O) \quad (IV)$$

In one or more embodiments, the epoxy resin(s) in the emulsified resin-based LCM compositions may include at least one of a bisphenol-A-epichlorohydrin epoxy resin, an alkyl glycidyl ether, an alkyl diglycidyl ether, an aromatic glycidyl ether, or combinations of these. In some embodiments, the epoxy resin in the LCM composition may include at least one of 1,6-hexanediol diglycidyl ether, alkyl glycidyl ethers having from 12 to 14 carbon atoms, butyl glycidyl ether, 2,3-epoxypropyl o-tolyl ether, cyclohexanedimethanol diglycidyl ether, bisphenol-A-epichlorohydrin epoxy resin, or combinations of these. In some embodiments, the epoxy resin(s) of the emulsified resin-based LCM compositions may include at least one of 1,6-hexanediol diglycidyl ether, alkyl glycidyl ethers having from 12 to 14 carbon atoms, 2,3-epoxypropyl o-tolyl ether, butyl glycidyl ether, cyclohexanedimethanol diglycidyl ether, or combinations of these.

The epoxy resin(s) may have an epoxy value of from 4.5 epoxy equivalents per kilogram of the epoxy resin to 5.5 epoxy equivalents per kilogram of the epoxy resin. The epoxy equivalent weight of an epoxy resin is the weight of the epoxy resin in grams that contains one equivalent weight of epoxy. The epoxy equivalent weight of the epoxy resin is equal to the molecular weight of the epoxy resin divided by the average number of epoxy groups in the epoxy resin. The epoxy resin(s) may have an epoxy equivalent weight of from 170 to 350 grams of resin per epoxy equivalent (g/eq). The epoxy value and epoxy equivalent weight of an epoxy resin may be determined according to ASTM-D1652. Other methods of determining the epoxy value and epoxy equivalent weight of the epoxy resin may also be used to determine the epoxy value or epoxy equivalent weight of the epoxy resin.

In some embodiments, the epoxy resin(s) may be modified with a reactive diluent. The type and amount of reactive diluent may influence the viscosity, flexibility, hardness, chemical resistance, mechanical properties, plasticizing effect, reactivity, crosslinking density, or other properties of the epoxy resin. In some embodiments, the reactive diluent may be added to the epoxy resin to change the viscosity of the epoxy resin(s), such as to reduce the viscosity of the epoxy resin. In other embodiments, the reactive diluents may be added to improve at least one of the adhesion, the flexibility, and the solvent resistance of the epoxy resin(s). The reactive diluent can be a non-functional, mono-functional, di-functional, or multi-functional reactive diluent. For example, a non-functional reactive diluent does not have an epoxide functional group. As used in relation to reactive diluents, the term "functional" refers to the reactive diluent having at least one epoxide functional group. A functional reactive diluent may have one, two, three, or more than three epoxide functional groups. The term "non-functional," as used in relation to reactive diluents, refers to a reactive diluent that does not have at least one epoxide functional group. Thus, a non-functional reactive diluent does not have at least one epoxide functional group, but still participates in at least one chemical reaction during reaction of the epoxide resin. The term "non-reactive diluent" refers to a diluent that does not participate in a chemical reaction during reaction of the epoxy resin(s). Examples of reactive and non-reactive diluents may include, but are not limited to, propylene glycol diglycidyl ether, butanediol diglycidyl ether, cardanol glycidyl ether derivatives, propanetriol triglycidyl ether, aliphatic monoglycidyl ethers of $C_{13}$-$C_{15}$ alcohols, or combinations of functional or non-functional reactive diluents and non-reactive diluents. In some embodiments, the epoxy resin may include a reactive diluent having the formula (V):

$$R^3\text{—O—}CH_2\text{—}(C_2H_3O) \quad (V)$$

where $R^3$ may be a linear or branched hydrocarbyl having from 12 to 14 carbon atoms. $R^3$ may be linear, branched, or cyclic. In some embodiments, $R^3$ may be an alkyl group.

The epoxy resin(s) in the emulsified resin-based LCM compositions may include an amount of reactive diluent that modifies one or more of the viscosity, adhesion, the flexibility, or the solvent resistance of the epoxy resin. In some embodiments, the epoxy resin(s) may include from 1 wt % to 30 wt % reactive diluent based on the total weight of the epoxy resin portion of the epoxy resin(s). As used in this disclosure, the term "epoxy resin portion" refers to the epoxy resin(s) and does not include crosslinkers, accelerators, retarders, or additives. The epoxy resin portion may include the epoxy resin(s) and any added reactive or non-reactive diluent. In some embodiments, the epoxy resin(s) may include from about 1 wt % to 20 wt %, from about 1 wt % to about 16 wt %, from about 1 wt % to about 14 wt %, from about 1 wt % to about 12 wt %, from about 5 wt % to about 30 wt %, from about 5 wt % to about 20 wt %, from about 5 wt % to about 16 wt %, from about 5 wt % to about 14 wt %, from about 5 wt % to about 12 wt %, from about 10 wt % to about 30 wt %, from about 10 wt % to about 20 wt %, from about 10 wt % to about 16 wt %, from about 10 wt % to about 14 wt %, from about 12 wt % to about 30 wt %, from about 12 wt % to about 20 wt %, from about 12 wt % to about 16 wt %, from about 14 wt % to about 30 wt %, from about 14 wt % to about 20 wt %, or from about 14 wt % to about 16 wt % reactive diluent based on the total weight of the epoxy resin(s).

In some embodiments, the epoxy resin(s) may include bisphenol-A-(epichlorohydrin) epoxy resin with oxirane mono [($C_{12}$-$C_{14}$)-alkyloxy)methyl] derivatives. The bisphenol-A-epichlorohydrin epoxy resin is an epoxy resin made by reaction of bisphenol-A and epichlorohydrin. The bisphenol-A-(epichlorohydrin) epoxy resin may then be modified with the reactive diluent oxirane mono [($C_{12}$-$C_{14}$)-alkyloxy) methyl] derivatives to reduce the viscosity of the resin and improve the adhesion, flexibility, and solvent resistance of the final cured epoxy. The bisphenol-A-(epichlorohydrin) epoxy resin with the reactive diluent oxirane mono [($C_{12}$-$C_{14}$)-alkyloxy) methyl] derivatives may modify the viscosity of the emulsified resin-based LCM compositions, or may provide the emulsified resin-based LCM compositions with a non-crystalizing resin and improved mechanical and chemical resistance compared to compositions without the bisphenol-A-(epichlorohydrin) epoxy resin with the reactive diluent oxirane mono [($C_{12}$-$C_{14}$)-alkyloxy) methyl] derivatives. In some embodiments, the epoxy resin portion may include from about 70 wt % to about 90 wt %, from about 75 wt % to about 85 wt %, from about 76 wt % to about 84 wt %, from about 77 wt % to about 84 wt %, from about 78 wt % to about 83 wt %, or from about 78 wt % to about 82 wt %, of the bisphenol-A-epichlorohydrin epoxy resin based on the total weight of the epoxy resin portion of the epoxy resin(s). In some embodiments, the epoxy resin(s) may include from about 10 wt % to about 30 wt %, from about 15 wt % to about 25 wt %, from about 16 wt % to about 24 wt %, from about 17 wt % to about 23 wt %, from about 18 wt % to about 22 wt %, or from about 18 wt % to about 21 wt % oxirane mono[($C_{12}$-$C_{14}$)-alkyloxy)methyl] derivatives based on the total weight of the epoxy resin portion of the epoxy resin(s).

In one or more embodiments, the epoxy resin(s) may include bisphenol-A-(epichlorohydrin) epoxy resin with the reactive diluent oxirane mono [($C_{12}$-$C_{14}$)-alkyloxy) methyl] derivatives may have an epoxy value of from 4.76 epoxy equivalents per kilogram of epoxy resin to 5.26 epoxy equivalents per kilogram of epoxy resin. The epoxy resin(s) comprising the bisphenol-A-(epichlorohydrin) epoxy resin with the reactive diluent oxirane mono [($C_{12}$-$C_{14}$)-alkyloxy) methyl] derivatives may have an epoxy equivalent weight of 190 g/eq to 210 g/eq and a dynamic viscosity of from 600 millipascal seconds (mPa*s) to 1200 mPa*s, or 600 mPa*s to 900 mPa*s.

The epoxy resin(s) of the may include 2,3-epoxypropyl-o-tolyl ether, which may have an epoxy equivalent weight of from 170 g/eq to 190 g/eq and exhibit a dynamic viscosity of from 7 mPa*s to 10 mPa*s. In other embodiments, the epoxy resin(s) may include alkyl glycidyl ethers having from 12 to 14 carbon atoms, which may have an epoxy equivalent weight of from 270 g/eq to 305 g/eq and may exhibit a dynamic viscosity of from 5 mPa*s to 12 mPa*s. In some embodiments, the epoxy resin(s) may include 1,6-hexanediol diglycidyl ether, which may have an epoxy equivalent weight of from 150 g/eq to 170 g/eq and may exhibit a dynamic viscosity of from 20 mPa*s to 30 mPa*s. In one or more embodiments, the epoxy resin(s) may include cyclohexanedimethanol diglycidyl ether, which may have an epoxy equivalent weight of from 125 g/eq to 145 g/eq and may exhibit a dynamic viscosity of from 50 mPa*s to 70 mPa*s. In some embodiments, the epoxy resin(s) may include butyl glycidyl ether, which may have an epoxy equivalent weight of from 120 g/eq to 140 g/eq and may exhibit a dynamic viscosity of from 400 mPa*s to 500 mPa*s.

In one or more embodiments, the epoxy resin(s) of the emulsified resin-based LCM compositions may include a combination of two or more of bisphenol-A-based epoxy resins, bisphenol-F-based epoxy resins, aliphatic epoxy resins, aromatic epoxy resins, Novalac resins, or combinations of these epoxy resins. In some embodiments, the epoxy resin(s) in the emulsified resin-based LCM compositions may include two or more of 1,6-hexanediol diglycidyl ether, alkyl glycidyl ethers having from 12 to 14 carbon atoms, butyl glycidyl ether, 2,3-epoxypropyl o-tolyl ether, cyclohexanedimethanol diglycidyl ether, bisphenol-A-epichlorohydrin epoxy resin, or combinations of these. In some embodiments, the epoxy resin(s) in the emulsified resin-based LCM compositions may include bisphenol-A-epichlorohydrin epoxy resin and butyl glycidyl ether. In some embodiments, the epoxy resin in the emulsified resin-based LCM compositions may include bisphenol-A-epichlorohydrin epoxy resin, butyl glycidyl ether, and cyclohexanedimethanol diglycidyl ether.

The emulsified resin-based LCM compositions may include epoxy resin(s) in an amount from about 5 wt % to about 75 wt % epoxy resin based on the total weight of the LCM composition. In some embodiments, the LCM composition may include from about 5 wt % to about 75 wt %, from about 10 wt % to about 70 wt %, from about 15 wt % to about 70 wt %, from about 20 wt % to about 65 wt %, from about 25 wt % to about 60 wt %, from about 30 wt % to about 60 wt %, from about 35 wt % to about 59 wt %, from about 40 wt % to about 58 wt %, from about 45 wt % to about 57 wt %, from about 50 wt % to about 57 wt %, or from about 52 wt % to about 57 wt %, epoxy resin(s) based on the total weight of the LCM composition.

In one or more embodiments, the emulsified resin-based LCM compositions may include one or more crosslinkers or curing agents to crosslink the epoxy resin(s). The crosslinkers may include at least one amine group. For example, crosslinkers with amine functional groups may include, but are not limited to, at least one of an amine, polyamine, amine adduct, polyamine adduct, alkanolamine, phenalkamines, or combinations of these. Amine or polyamine crosslinkers may include, but are not limited to, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, or amine adducts such as cycloaliphatic amine adducts or polyamine adducts.

In one or more embodiments, the crosslinkers may include at least one of diethylenetriamine (DETA), diethyltoluenediamine (DETDA), polyoxypropylene diamine, trimethyl hexamethylene diamine (TMD), triethylenetetramine (TETA), meta-xylenediamine (MXDA), aminoethylpiperazine (AEP), tetraethylenepentamine (TEPA), polyetheramine, isophoronediamine (IPDA), or combinations of these. In some embodiments, the crosslinkers may include at least one of DETA, DETDA, polyoxypropylene diamine, or combinations of these. The epoxy resin(s) in the emulsified resin-based LCM compositions may include a plurality of crosslinkers.

The crosslinkers may be an amine crosslinker having an amine value that enables the amine crosslinker to fully crosslink the epoxy resin(s). The amine value of a crosslinker gives the active hydrogen (NH) content of an amine crosslinker. The amine value is expressed as the weight in milligrams of potassium hydroxide (KOH) needed to neutralize the NH in 1 gram of the amine curing agent. In some embodiments, the crosslinker may have an amine value of from 250 milligrams of KOH per gram (mg KOH/g) to 1700 mg KOH/g, from 250 mg KOH/g to 1650 mg KOH/g, from 250 mg KOH/g to 1600 mg KOH/g, from 450 mg KOH/g to 1700 mg KOH/g, from 450 mg KOH/g to 1650 mg KOH/g, from 450 mg KOH/g to 1600 mg KOH/g, from 650 mg KOH/g to 1700 mg KOH/g, from 650 mg KOH/g to 1650 mg KOH/g, or from 650 mg KOH/g to 1600 mg KOH/g. The amine value may be determined by titrating a solution of the crosslinker with a dilute acid, such as a 1 N solution of hydrogen chloride (HCl). The amine value may then be calculated from the amount of HCl needed to neutralize the amine in the solution according to Equation 1 (Eq. 1):

$$\frac{V_{HCl} * N_{HCl} * MW_{KOH}}{W} \qquad \text{Eq. 1}$$

where $V_{HCl}$ is the volume in milliliters of HCl needed to neutralize the amine, $N_{HCl}$ is the normality of HCl used to titrate the amine, $MW_{KOH}$ is the molecular weight of KOH in grams per mole, and W is the weight in grams of the curing agent sample titrated. The amine number of the known pure amine curing agent may be calculated from Equation 2 (Eq. 2):

$$\frac{1000 * MW_{KOH}}{MW_{curing\ agent}} \qquad \text{Eq. 2}$$

where $MW_{KOH}$ is the molecular weight of KOH in grams per mole, and $MW_{curing\ agent}$ is the molecular weight of the curing agent in grams per mole.

The amine crosslinker may have an amine hydrogen equivalent weight (AHEW) that enables the amine crosslinker to fully cure the epoxy resin(s). The AHEW of an amine crosslinker refers to the grams of the amine curing agent containing 1 equivalent of amine. The AHEW of an amine curing agent may be calculated by dividing the molecular weight of the amine curing agent in grams per mole by the number of active hydrogens per molecule. In some embodiments, the crosslinker may be an amine crosslinker having an AHEW of from 20 grams (g) to 120 g, from 20 g to 115 g, from 20 g to 110 g, from 20 g to 100 g, from 40 g to 120 g, from 40 g to 115 g, from 40 g to 110 g, from 40 g to 110 g, from 60 g to 120 g, from 60 g to 115 g, or from 60 g to 110 g determined according to the methods according to one or more embodiments.

In one or more embodiments, the emulsified resin-based LCM compositions may include an amount of crosslinkers sufficient to crosslink the epoxy resin(s) of the LCM composition to a semi-solid or solid state. The LCM compositions may include from about 0.01 wt % to about 10 wt % crosslinker based on the total weight of the LCM composition before setting. In some embodiments, the LCM composition may have from about 0.02 wt % to about 5 wt %, from about 0.05 wt % to about 4 wt %, from about 0.1 wt % to about 3 wt %, from about 0.5 wt % to about 3 wt %, from about 0.9 wt % to about 2.5 wt %, or from about 1 wt % to about 2 wt % crosslinker based on the total weight of the LCM composition.

In one or more embodiments, the emulsified resin-based LCM compositions may include one or more emulsifiers. In some embodiments, the emulsifiers may include a polyaminated fatty acid. For example, the polyaminated fatty acid may have the chemical formula (VI):

(VI)

where $R^4$ is a hydrocarbyl group and $R^5$ is a hydrocarbyl group or an alkylene carboxylate group having formula —$R^6$—COOH, where $R^6$ is a saturated or unsaturated hydrocarbylene. $R^4$ may be a saturated or unsaturated hydrocarbyl group, such as a saturated alkyl (—$C_yH_{2y+1}$ where y is the number of carbon atoms in $R^4$), an unsaturated alkyl (—$C_yH_{(2y-2z-4w+1)}$ where y is the number of carbon atoms in $R^4$, z is zero or a number of double bonds in $R^4$, and w is zero or a number of triple bonds in $R^4$), an alkenyl (—CH=CHC$_y$H$_{(2y-2z-4w+1)}$ where y is zero or an integer greater than zero, z is zero or a number of additional double bonds in $R^8$, and w is zero or the number of triple bonds in $R^4$), or an alkynyl (—C≡CC$_y$H$_{(2y-2z-4w+1)}$ where y is zero or an integer greater than zero, z is zero or the number of double bonds in $R^4$, and w is is zero or a number of additional triple bonds in $R^4$). Each of the general formulas for saturated alkyl, unsaturated alkyl, saturated alkenyl, alkenyl, and alkynyl includes both linear groups and branched groups having 1, 2, 3, 4, 5, or greater than 5 branches at individual carbon atoms. Examples of linear hydrocarbyl groups include, without limitation, linear alkyls of formula —(CH$_2$)$_y$CH$_3$ and linear alkenyls of formula —CH=(CH$_2$)$_y$CH$_3$ where y is an integer from 0 to 15. Specific examples of linear alkyls include methyl, ethyl, n-propyl, n-butyl, n-hexyl, n-heptyl, n-octyl, n-nonyl, and n-decyl. Specific examples of linear alkenyls include vinyl and allyl. In further examples, $R^4$ may include a cyclic hydrocarbyl group, such as but not limited to a phenyl group, cyclohexyl group, or cycloheptyl group. In embodiments, $R^4$ may be a linear or branched hydrocarbyl group. $R^4$ may have from 1 to 20 carbon atoms (carbons), such as from 1 to 18 carbons, from 1 to 16 carbons, from 1 to 14 carbons, from 1 to 12 carbons, from 1 to 10 carbons, from 6 to 20 carbons, from 6 to 18 carbons, from 6 to 16 carbons, from 6 to 14 carbons, from 6 to 12 carbons, from 6 to 10 carbons, from 8 to 20 carbons, from 8 to 18 carbons, from 8 to 16 carbons, from 8 to 14 carbons, from 8 to 12 carbons, from 8 to 10 carbons, from 10 to 20 carbons, from 20 to 18 carbons, from 10 to 16 carbons, from 10 to 14 carbons, from 10 to 12 carbons, from 12 to 20 carbons, from 12 to 18 carbons, from 12 to 16 carbons, from 12 to 14 carbons, from 14 to 20 carbons, from 14 to 18 carbons, from 14 to 16 carbons, from 16 to 20 carbons, or 13 carbons. In some embodiments, $R^8$ may be a saturated linear hydrocarbyl group. Alternatively, in other embodiments, $R^8$ may be a branched hydrocarbyl group.

In one or more embodiments, $R^5$ can be a hydrocarbyl group or an alkylene carboxylate group having formula $—R^6—COOH$, where $R^6$ is a saturated or unsaturated hydrocarbylene group. In some embodiments, $R^5$ may be a saturated or unsaturated hydrocarbyl group, such as a saturated alkyl ($—C_yH_{2y+1}$ where y is the number of carbon atoms in $R^5$), an unsaturated alkyl ($—C_yH_{(2y-2z-4w+1)}$ where y is the number of carbon atoms in $R^5$, z is zero or a number of double bonds in $R^9$, and w is zero or a number of triple bonds in $R^5$), an alkenyl ($—CH=CHC_yH_{(2y-2z-4w+1)}$ where y is zero or an integer greater than zero, z is zero or a number of additional double bonds in $R^9$, and w is zero or the number of triple bonds in $R^5$), or an alkynyl ($—C≡CC_yH_{(2y-2z-4w+1)}$ where y is zero or an integer greater than zero, z is zero or the number of double bonds in $R^5$, and w is zero or a number of additional triple bonds in $R^5$). Each of the general formulas for saturated alkyl, unsaturated alkyl, saturated alkenyl, alkenyl, and alkynyl includes both linear groups and branched groups having 1, 2, 3, 4, 5, or greater than 5 branches at individual carbon atoms. Examples of linear hydrocarbyl groups include, without limitation, linear alkyls of formula $—(CH_2)_yCH_3$ and linear alkenyls of formula $—CH=(CH_2)_yCH_3$ where y is an integer from 0 to 15. Specific examples of linear alkyls include methyl, ethyl, n-propyl, n-butyl, n-hexyl, n-heptyl, n-octyl, n-nonyl, and n-decyl. Specific examples of linear alkenyls include vinyl and allyl. In further examples, $R^5$ may include a cyclic hydrocarbyl group, such as but not limited to a phenyl group, cyclohexyl group, or cycloheptyl group. $R^5$ may have from 1 to 10 carbons, such as from 1 to 8 carbons, from 1 to 6 carbons, from 1 to 4 carbons, from 2 to 10 carbons, from 2 to 8 carbons, from 2 to 6 carbons, from 2 to 4 carbons, from 4 to 10 carbons, or from 4 to 8 carbons. In some embodiments, $R^5$ may be methyl ($—CH_3$), phenyl ($—(C_6H_5)$), or ethyl ($—CH_2CH_3$).

Alternatively, in other embodiments, $R^9$ may be an alkylene carboxylate group having formula $—R^6—COOH$, where $R^6$ is a saturated or unsaturated hydrocarbylene group, such as an alkylene, alkenylene, or a cyclic hydrocarbylene. Cyclic hydrocarbylenes may include aromatic or non-aromatic cyclic hydrocarbylenes, such as but are not limited to, phenyl groups, cyclohexyl groups, or combinations of these. $R^6$ may have from 1 to 10 carbons, such as from 1 to 8 carbons, from 1 to 6 carbons, from 1 to 4 carbons, from 2 to 10 carbons, from 2 to 8 carbons, from 2 to 6 carbons, from 2 to 4 carbons, from 4 to 10 carbons, or from 4 to 8 carbons. In some embodiments, $R^6$ may be $—CH_2CH_2—$ or $—CH=CH—$.

In embodiments, $R^5$ may be selected from the group consisting of methyl, phenyl, $—CH_2CH_2—COOH$, and $—CH=CH—COOH$. For example, in some embodiments, $R^5$ may have the formula $—CH=CH—COOH$, such that the polyaminated fatty acid compound has formula (VII):

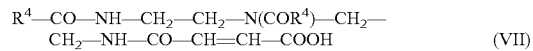

$$R^4—CO—NH—CH_2—CH_2—N(COR^4)—CH_2—CH_2—NH—CO—CH=CH—COOH \quad (VII)$$

where $R^4$ is hydrocarbyl group having from 1 to 20 carbon atoms. In another example, $R^5$ may have the formula $—CH_3$ such that the polyaminated fatty acid compound has the formula (VIII):

$$R^4—CO—NH—CH_2—CH_2—N(COR^4)—CH_2—CH_2—NH—CO—CH_3 \quad (VIII)$$

where $R^4$ is hydrocarbyl group having from 1 to 20 carbon atoms. In still another example, $R^5$ may be phenyl ($—(C_6H_5)$) such that the polyaminated fatty acid compound has the formula (IX):

$$R^4—CO—NH—CH_2—CH_2—N(COR^4)—CH_2—CH_2—NH—CO—(C_6H_5) \quad (IX)$$

where $R^4$ is hydrocarbyl group having from 1 to 20 carbon atoms. In another example, $R^5$ may have the formula $—CH_3$ such that the polyaminated fatty acid compound has the formula (X):

$$R^4—CO—NH—CH_2—CH_2—N(COR^4)—CH_2—CH_2—NH—CO—CH_2—CH_2—COOH \quad (X)$$

where $R^4$ is hydrocarbyl group having from 1 to 20 carbon atoms.

The polyaminated fatty acid may be synthesized by a two-step process. In the first step, a fatty acid is reacted with diethylene triamine (DETA) to produce an amide and water. The fatty acid has the general chemical formula $R^4—COOH$, where $R^4$ is the hydrocarbyl group previously described with respect to formula (IX).

The fatty acid having formula $R^4—COOH$ may be a naturally-derived or a synthetically-derived fatty acid. The fatty acid may be a naturally-occurring fatty acid, such as a fatty acid derived from natural sources, example of which may include animal fats or vegetable oils. The fatty acid may be produced through hydrolysis of triglycerides, phospholipids, or both triglycerides and phospholipids and removal of glycerol. The triglycerides and phospholipids may be derived from natural sources such as animal fats or vegetable fats. Triglycerides and phospholipids from plant-based sources may include but are not limited to coconut oil, palm oil, soybean oil, tall oil, tall oil fatty acids (TOFA), or combinations of these sources. In some examples, the fatty acid may be a saturated fatty acid resulting from hydrogenation of a naturally-derived unsaturated fatty acid. Alternatively, the fatty acid may be a synthetic fatty acid prepared from a petroleum source or other source through one or more synthesis reactions. In examples, the fatty acid may be a synthetic fatty acid derived through hydrocarboxylation of alkenes. Non-limiting examples of fatty acids may include, but are not limited to, caprylic acid, capric acid, lauric acid, myristic acid, palmitic acid, stearic acid, arachidic acid, myristoleic acid, palmitoleic acid, sapienic acid, oleic acid, elaidic acid, vaccenic acid, linoleic acid, linoelaidic acid, α-linoleic acid, arachidonic acid, eicosapentaenoic acid, or combinations of any of these fatty acids. Other naturally-occurring or synthetic fatty acids are also contemplated. In some embodiments, the fatty acid may be tall oil fatty acid. Tall oil fatty acid may include at least one of palmitic acid, oleic acid, linoleic acid, or combinations of these. In embodiments, the fatty acid may be a tall oil fatty acid derived from distillation of crude tall oil. In one or more embodiments, the fatty acid may include a hydrocarbyl group ($R^4$) having from 12 to 14 carbon atoms. In one or more embodiments, the polyaminated fatty acid compounds may be made using a saturated linear fatty acid having a saturated linear hydrocarbyl group $R^4$ with 12 carbon atoms.

In one or more embodiments, the emulsified resin-based LCM compositions may have from about 0.1 wt % to about 20 wt %, 0.1 wt % to about 18 wt %, from about 0.1 wt % to about 15 wt %, from about 0.1 wt % to about 10 wt %, from about 0.5 wt % to about 20 wt %, from about 0.5 wt % to about 18 wt %, from about 0.5 wt % to about 15 wt %, from about 0.5 wt % to about 10 wt %, from about 1 wt % to about 20 wt %, from about 1 wt % to about 18 wt %, from about 1 wt % to about 15 wt %, from about 1 wt % to about 10 wt %, or from about 1 wt % to about 5 wt % emulsifier(s) based on the total weight of the LCM composition.

In one or more embodiments, the emulsified resin-based LCM compositions may include water in an amount of from about 5 wt % to about 25 wt %, from about 7 wt % to about 20 wt %, from about 8 wt % to about 18 wt %, from about 8 wt % to about 17 wt %, from about 9 wt % to about 16 wt %, or from about 10 wt % to about 15 wt % water based on the total weight of the LCM composition.

In one or more embodiments, the emulsified resin-based LCM compositions may include one or more optional cementitious and/or weighting agents. The optional cementitious and/or weighting agents may include, but are not limited to, class G cement, barite (barium sulfate), calcium carbonate ($CaCO_3$), ilmenite, or any combination of these cementitious and/or weighting agents.

The emulsified resin-based LCM compositions may include from about 0.1 wt % to about 70 wt %, from about 0.1 wt % to about 60 wt %, from about 0.1 wt % to about 50 wt %, from about 0.1 wt % to about 40 wt %, from about 1 wt % to about 70 wt %, from about 1 wt % to about 60 wt %, from about 1 wt % to about 50 wt %, from about 1 wt % to about 40 wt %, from about 5 wt % to about 70 wt %, from about 5 wt % to about 60 wt %, from about 5 wt % to about 50 wt %, from about 5 wt % to about 40 wt %, from about 10 wt % to about 70 wt %, from about 10 wt % to about 60 wt %, from about 10 wt % to about 50 wt %, or from about 20 wt % to about 70 wt % cementitious and/or weighting agents based on the total weight of the LCM composition.

In some embodiments, the LCM compositions may include other additives and modifiers, such as but not limited to cementing additives, viscosifiers, retarders, dispersants, fluid loss additives, and expansion additives, or combinations of these.

The thickening time of the emulsified resin-based LCM compositions may be inversely proportional to the amount of crosslinker(s) in the LCM compositions. For example, increasing the amount of crosslinker(s) in the emulsified resin-based LCM compositions may decrease the thickening time of the emulsified resin-based LCM compositions. Conversely, decreasing the amount of crosslinker(s) in the emulsified resin-based LCM compositions may increase the thickening time of the emulsified resin-based LCM compositions. The emulsified resin-based LCM compositions may include an amount of crosslinker(s) resulting in a thickening time of less than 4 hours, or from about 10 minutes to about 4 hours, from about 1 hour to about 4 hours, from about 1 hour 30 minutes to about 4 hours, or from about 2 hours to about 3 hours 45 minutes.

In one or more embodiments, the emulsified resin-based LCM compositions are capable of sealing a lost circulation zone in a low pressure formation, such as formations having pressures of from about 63 pcf (equivalent to about 1009 kg/m$^3$) to about 99 pcf (equivalent to about 1586 kg/m$^3$). The emulsified resin-based LCM compositions are capable of sealing a lost circulation zone at shallow depths, such as depths of up to 5000 feet (equivalent to about 1524 meters (m), where 1 ft=0.305 m).

The emulsified resin-based LCM compositions may have a density of greater than or equal to about 63 pcf (equivalent to about 1009 kg/m$^3$), or from about 63 pcf (equivalent to about 1009 kg/m$^3$) to about 99 pcf (equivalent to about 1586 kg/m$^3$), or from about 65 pcf (equivalent to about 1041 kg/m$^3$) to about 90 pcf (equivalent to about 1442 kg/m$^3$), or from about 65 pcf (equivalent to about 1041 kg/m$^3$) to about 85 pcf (equivalent to about 1362 kg/m$^3$), or from about 69 pcf (equivalent to about 1105 kg/m$^3$) to about 80 pcf (equivalent to about 1281 kg/m$^3$), or from about 70 pcf (equivalent to about 1121 kg/m$^3$) to about 79 pcf (equivalent to about 1265 kg/m$^3$), and may be capable of being injected through a drill bit of a drill string into the lost circulation zone. The emulsified resin-based LCM compositions may include epoxy resin(s), crosslinker(s), emulsifier(s), water, and optionally cementing and/or weighting agent(s). The epoxy resin(s) may include one or more than one of the epoxy resins described in this disclosure. The crosslinker(s) may include one or a plurality of curing agents described in this disclosure. The cementitious and/or weighting agent(s) may include one or a plurality of cementing or weighting agents described in this disclosure. The emulsifier(s) may include one or a plurality of the emulsifiers described in this disclosure. The LCM compositions may include any other constituent, property, or characteristic previously described in this disclosure for the LCM composition.

The emulsified resin-based LCM compositions may be used in methods to eliminate or reduce lost circulation from a well. The methods may include introducing an emulsified resin-based LCM composition, which may produce a barrier preventing wellbore fluids from passing into the lost circulation zone. The emulsified resin-based LCM composition may include an epoxy resin, an emulsifier comprising a polyaminated fatty acid, water, a crosslinker, and an optional cementitious and/or weighting agent, such that the emulsified resin-based LCM compositions has a density of greater than or equal to 63 pcf. The emulsified resin-based LCM compositions may include from about 5 wt % to about 75 wt % epoxy resin(s), from about 0.01 wt % to about 10 wt % crosslinker(s), from about 0.1 wt % to about 20 wt % emulsifier comprising a polyaminated fatty acid, from about 5 wt % to about 25 wt % water, and from 0 wt % to about 70 wt % cementitious or weighting agent(s). The epoxy resin(s) may include one or more than one of the epoxy resins described in this disclosure. The crosslinker(s) may include one or a plurality of crosslinkers described in this disclosure. The cementitious or weighting agent(s) may include one or a plurality of cementitious or weighting agents described in this disclosure. The emulsifier(s) may include one or a plurality of the emulsifiers described in this disclosure. The emulsified resin-based LCM compositions of the methods according to some embodiments may have a density of greater than or equal to about 63 pcf (equivalent to about 1009 kg/m$^3$), or from about 63 pcf (equivalent to about 1009 kg/m$^3$) to about 99 pcf (equivalent to about 1586 kg/m$^3$), or from about 65 pcf (equivalent to about 1041 kg/m$^3$) to about 90 pcf (equivalent to about 1442 kg/m$^3$), or from about 65 pcf (equivalent to about 1041 kg/m$^3$) to about 85 pcf (equivalent to about 1362 kg/m$^3$), or from about 69 pcf (equivalent to about 1105 kg/m$^3$) to about 80 pcf (equivalent to about 1281 kg/m$^3$), or from about 70 pcf (equivalent to about 1121 kg/m³) to about 79 pcf (equivalent to about 1265 kg/m³), and may be capable of being injected through a drill bit of a drill string into the lost circulation zone. The emulsified resin-based LCM compositions of the methods according to some embodiments may have a thickening time of less than 4 hours, or from about 10 minutes to about 4 hours, from about 1 hour to about 4 hours, from about 1 hour 30 minutes to about 4 hours, or from about 2 hours to about 3 hours 45 minutes. The emulsified resin-based LCM compositions of the methods according to some embodiments may include any other constituent, property, or characteristic previously described in this disclosure for the LCM compositions.

Introducing the emulsified resin-based LCM compositions into the lost circulation zone may include injecting the emulsified resin-based LCM compositions through the drill bit of the drill string. In some embodiments, the drill string may not be removed from the wellbore prior to introducing the emulsified resin-based LCM compositions to the lost circulation zone. The emulsified resin-based LCM compositions of the present disclosure are injectable through the drill bit so that the drill string does not need to be removed from the wellbore to replace the drill bit with an open-ended pipe or other injection device before injecting the emulsified resin-based LCM compositions into the lost circulation zone. Although described in this disclosure as being able to be injected through the drill bit, the emulsified resin-based LCM compositions may also be injected through other methods or techniques, such as but not limited to squeezing, injection through tubing, injection through the casing, or injection through the annulus. In some embodiments, the lost circulation zones may be located in low pressure formations, such as formations having pressures of from about 63 pcf to about 99 pcf. In some embodiments, the lost circulation zones may be at shallow depths, such as depths of up to 5000 feet. In some embodiments, one or more subsequent treatments with the emulsified resin-based LCM compositions may be conducted to fully treat the lost circulation zone.

EXAMPLES

The following examples are merely illustrative and should not be interpreted as limiting the scope of the present disclosure.

Examples 1-3: Preparation of LCM Compositions

In Examples 1-3, three different emulsified resin-based LCM samples were prepared. The compositions of Examples 1-3 are provided in Table 1.

For Examples 1-3, the LCM compositions were prepared by combining Resin 1 (RAZEEN® 2254 obtained from Jubail Chemical Industries LLC of Jubail, Saudi Arabia), Resin 2 (RAZEEN® 7106 obtained from Jubail Chemical Industries LLC of Jubail, Saudi Arabia), the polyaminated fatty acid emulsifier (LE SUPERMUL® obtained from Halliburton), the Class G cement, water, and the crosslinker diethylenetriamine (DETA) (RAZEENCURE® 931 ® (90-100% DETA) obtained from Jubail Chemical Industries LLC of Jubail, Saudi Arabia). The additives were mixed for 45 minutes.

Examples 4-6: Thickening Time Tests for the LCM Compositions

The thickening time tests were conducted under conditions simulating downhole temperature and pressure conditions using a high temperature high pressure (HTHP) Chandler Engineering Consistometer Model 8340. The LCM composition of Examples 1-3 were introduced to the HTHP consistometer, and the temperature and pressure of the LCM compositions were gradually increased. The temperature of the LCM composition was increased to a temperature of 170 degrees Fahrenheit (° F.) (77° C.) to simulate a bottom hole circulating temperature (BHCT) of 77° C., and the pressure was ramped up to a final pressure of 5000 pounds per square inch (psi) (34,474 kPa). The thickening times were measured using the HTHP consistometer when the compositions began to set by reaching a Bearden consistency of 70 Bc, the results are provided in Table 2.

TABLE 2

Thickening Times of the LCM Compositions of Examples 1-3

| Example | Example 1 | Example 2 | Example 3 |
|---|---|---|---|
| Mixing Duration (minutes) | 45 | 45 | 45 |
| Thickening Time (hours:minutes) | 3:45 | 3:37 | 2:30 |

As shown in Table 2, decreasing the concentration of crosslinker in the emulsified resin-based LCM compositions increases the thickening time of the LCM compositions. In other words, increasing the crosslinker concentration may reduce the time for a LCM composition according to one or more embodiments to thicken to a semi-solid or solid material sufficient to seal a lost circulation zone of a wellbore.

While only a limited number of embodiments have been described, those skilled in the art having benefit of this

TABLE 1

LCM Compositions for Examples 1-3

| | Example 1 | | Example 2 | | Example 2 | |
|---|---|---|---|---|---|---|
| Constituent | Grams (g) | Concentration (wt %) | Grams (g) | Concentration (wt %) | Grams (g) | Concentration (wt %) |
| Resin 1 | 320 | 44.8 | 320 | 44.7 | 320 | 44.6 |
| Resin 2 | 80 | 11.2 | 80 | 11.1 | 80 | 11.1 |
| Emulsifier | 20 | 2.8 | 20 | 2.8 | 20 | 2.8 |
| Class G cement | 190.6 | 26.7 | 190.6 | 26.6 | 190.6 | 26.5 |
| Water | 94 | 13.1 | 94 | 13.1 | 94 | 13.1 |
| Crosslinker | 10 | 1.4 | 11 | 1.5 | 12.24 | 1.7 | disclosure will appreciate that other embodiments can be devised which do not depart from the scope of the disclosure.

Although the preceding description has been described here with reference to particular means, materials and embodiments, it is not intended to be limited to the particulars disclosed here; rather, it extends to all functionally equivalent structures, methods and uses, such as those within the scope of the appended claims.

The presently disclosed methods and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optional" means that the subsequently described limitation may or may not be present. The description includes instances where the limitation is present and instances where it is not present.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

The invention claimed is:

1. A lost circulation material (LCM) composition comprising:
   5 to 75 wt % of an emulsified epoxy resin;
   0.1 to 20 wt % of an emulsifier comprising a polyaminated fatty acid;
   5 to 25 wt % water;
   1.4 to 1.7 wt % of a crosslinker; and
   wherein the LCM composition has a thickening time ranging from 2 hours to 3 hours and 45 minutes; and
   wherein the LCM composition has a density of from about 63 pounds per cubic foot (pcf) to about 99 pcf and is capable of being injected through a drill bit of a drill string into a lost circulation zone in wellbores.

2. The LCM composition of claim 1, where the LCM composition has a density of from about 70 pcf to about 79 pcf.

3. The LCM composition of claim 1, where the epoxy resin comprises at least one of bisphenol-A-epichlorohydrin epoxy resin, C12-C14 alkyl glycidyl ether derivatives, 2,3-epoxypropyl o-tolyl ether, 1,6-hexanediol diglycidyl ether, butyl glycidyl ether, cyclohexanedimethanol diglycidyl ether, or combinations of these.

4. The LCM composition of claim 1, where the epoxy resin comprises bisphenol -A-epichlorohydrin epoxy resin and C12-C14 alkyl glycidyl ether.

5. The LCM composition of claim 1 further comprising a reactive diluent comprising oxirane mono [(C12-C14)-alkyloxy) methyl] derivatives.

6. The LCM composition of claim 1, where the crosslinker comprises at least one of diethylenetriamine (DETA), diethyltoluenediamine (DETDA), polyoxypropylene diamine, or combinations of these.

7. The LCM composition of claim 1, where the LCM composition comprises from about 0 wt % to about 70 wt % cementitious and/or weighting agent.

8. The LCM composition of claim 1, where the LCM composition includes a cementitious and/or weighting agent.

9. The LCM composition of claim 1, where the cementitious and/or weighting agent comprises class G cement, barite (barium sulfate), calcium carbonate ($CaCO_3$), ilmenite, or combinations of these.

10. A method of eliminating or reducing lost circulation in a lost circulation zone from a well, the method comprising:
    introducing a first lost circulation material (LCM) composition into the well, the first LCM composition comprising:
    an emulsified epoxy resin;
    an emulsifier comprising a polyaminated fatty acid;
    water;
    1.4 to 1.7 wt % of a crosslinker; and
    an optional cementitious and/or weighting agent selected from the group consisting of calcium carbonate ($CaCO_3$), ilmenite, and a combination thereof,
    wherein the LCM composition has a thickening time ranging from 2 hours to 3 hours and 45 minutes: and
    wherein the first LCM composition has a density of from about 63 pounds per cubic foot (pcf) to about 99 pcf.

11. The method of claim 10, further comprising thickening the first LCM composition in the well.

12. The method of claim 11, further comprising introducing a second LCM composition in the well after the thickening of the first LCM composition.

13. The method of claim 10, where the first LCM composition has a density of from about 70 pcf to about 79 pcf.

14. The method of claim 10, where the lost circulation zone is located in formations having pressures of from about 63 pcf to about 99 pcf.

15. The method of claim 10, where the lost circulation zone is located at a depth of up to 5000 feet.

* * * * *